(12) United States Patent
Mottonen et al.

(10) Patent No.: US 8,213,659 B2
(45) Date of Patent: Jul. 3, 2012

(54) APPARATUS WITH ADJUSTABLE SPEAKER ARRANGEMENT

(75) Inventors: Pekka Mottonen, Bunkeflostrand (SE); Hong-Jae Park, Valby (DK); Koray Ozcan, Farnborough (GB)

(73) Assignee: Nokia Corporation, Espoo (FI)

( * ) Notice: Subject to any disclaimer, the term of this patent is extended or adjusted under 35 U.S.C. 154(b) by 342 days.

(21) Appl. No.: 12/459,346

(22) Filed: Jun. 30, 2009

(65) Prior Publication Data

US 2010/0329496 A1 Dec. 30, 2010

(51) Int. Cl.
*H04R 25/00* (2006.01)
(52) U.S. Cl. .................. 381/349; 381/345; 381/386
(58) Field of Classification Search .................. 381/345, 381/349, 350, 351, 386, 71.6, 71.7; 181/145, 181/155, 156, 160, 199; 379/420.02, 433.02, 379/432; 455/569.1, 575.1
See application file for complete search history.

(56) References Cited

U.S. PATENT DOCUMENTS

| 6,002,949 A * | 12/1999 | Hawker et al. ............. 455/569.1 |
| 6,758,303 B2 * | 7/2004 | Zurek et al. ..................... 181/155 |
| 2004/0084244 A1 | 5/2004 | Zurek et al. ..................... 181/156 |
| 2004/0192417 A1 | 9/2004 | Nagasawa et al. ......... 455/575.1 |

FOREIGN PATENT DOCUMENTS

| EP | 1 758 348 A2 | 2/2007 |
| WO | WO 2009/014557 A1 | 1/2009 |

* cited by examiner

*Primary Examiner* — Huyen D Le
(74) *Attorney, Agent, or Firm* — Harrignton & Smith

(57) ABSTRACT

Apparatus includes a housing, the housing including a first body part and a second body part, the first body part being moveable relative to the second body part, wherein the housing has a first configuration when the first body part is in a first position relative to the second body part between and a second configuration when the first body part is in a second position relative to the second body part; and a speaker arrangement, wherein the speaker arrangement comprises a transducer, a front cavity coupled to a first side of the transducer, and an opening. The opening connects the front cavity to an exterior of the housing. A rear cavity is coupled to a second side of the transducer, the second side of the transducer being on an opposite side of the transducer to the first side of the transducer. The speaker arrangement has a first physical arrangement when the housing is in the first configuration and a second physical arrangement when the housing is in the second configuration, the first physical arrangement being different to the second physical arrangement.

18 Claims, 10 Drawing Sheets

APPARATUS WITH ADJUSTABLE SPEAKER ARRANGEMENT

FIELD OF THE INVENTION

This invention relates to apparatus comprising a housing and a speaker arrangement. In particular, the invention relates to an apparatus in which first and second body parts of the housing are movable relative to one another.

BACKGROUND TO THE INVENTION

It is well known to provide portable apparatus, such as mobile or cellular telephones, with speaker arrangements. A speaker arrangement comprises a transducer located within a mechanical environment. Speaker arrangements in such devices tend to be designed to be optimised for a particular requirement. The frequency response of speaker devices are determined largely by physical dimensions of the mechanical arrangement of the speaker arrangement devices, and by properties of the transducer. Physical dimensions of the mechanical arrangement are chosen by a designer so as to achieve a desired frequency response.

SUMMARY OF THE INVENTION

A first aspect of the invention provides apparatus comprising:
  a housing, the housing comprising a first body part and a second body part, the first body part being moveable relative to the second body part, wherein the housing has a first configuration when the first body part is in a first position relative to the second body part between and a second configuration when the first body part is in a second position relative to the second body part; and
  a speaker arrangement, wherein the speaker arrangement comprises:
    a transducer,
    a front cavity coupled to a first side of the transducer, and an opening, the opening connecting the front cavity to an exterior of the housing, and
    a rear cavity coupled to a second side of the transducer, the second side of the transducer being on an opposite side of the transducer to the first side of the transducer,
wherein the speaker arrangement has a first physical arrangement when the housing is in the first configuration and a second physical arrangement when the housing is in the second configuration, the first physical arrangement being different to the second physical arrangement.

The apparatus may be configured such that an area of the opening when the housing is in the first configuration is greater than the area of the opening when the apparatus is in the second configuration. Here, the opening may comprise plural channels, and the apparatus may be configured such that at least one of the plural channels are blocked when the housing is in the second configuration and such that the at least one of the plural channels are not blocked when the apparatus is in the first configuration. Alternatively, the opening may comprise plural channels formed in the second body part, and a blocking component attached with the first body part, and the apparatus may be configured such that at least one of the plural channels are blocked by the blocking component when the housing is in the second configuration and such that the at least one of the plural channels are not blocked by the blocking component when the apparatus is in the second configuration.

Therein the apparatus may be configured such that a length of the opening when the housing is in the first configuration is greater than the length of the opening when the apparatus is in the second configuration. Here, the opening may comprise an aperture in a first component when the apparatus is in the second configuration and wherein the opening comprises the aperture in the first component and a second aperture in a second component when the apparatus is in the first configuration, the first and second apertures being aligned when the apparatus is in the first configuration, and the first and second apertures not being aligned when the apparatus is in the second configuration. In this case the first component may be attached to or be integral with the second body part and the second component may be attached to or be integral with the first body part.

The apparatus may be configured such the internal volume of the rear cavity when the apparatus is in the first configuration is greater than the internal volume of the rear cavity when the apparatus is in the second configuration. Here, the apparatus may comprise a hollow component having one end attached to the first body part, the first end being sealed, and having a second end extending into a part of the rear cavity that is defined in the second body part, wherein the hollow component moves with the first body part relative to the second body part such that the internal volume of the rear cavity when the housing is in the first configuration is greater than the internal volume of the rear cavity when the apparatus is in the second configuration. In this case the apparatus may be configured such that the second end of the hollow component is closed when the housing is in the second configuration. Alternatively the apparatus may be configured such that the second end of the hollow component is located against a surface of the second body part that defines the rear cavity when the housing is in the second configuration.

The speaker arrangement may comprise a bass reflex port and wherein in the first physical arrangement the bass reflex port is closed and in the second physical arrangement the bass reflex port is open. Here, the apparatus may comprise a hollow component having one end attached to the first body part, the first end being sealed, and having a second end extending into a part of the rear cavity that is defined in the second body part, wherein the apparatus is configured such that the second end of the hollow component is closed when the housing is in the second configuration, wherein the hollow component includes a bass reflex port providing a channel between the interior of the hollow component and the exterior of the housing, and wherein the hollow component and the bass reflex port move with the first body part relative to the second body part such as to form a channel between the rear cavity and the exterior of the housing when the apparatus is in the first configuration.

The apparatus may be a hand-portable communications device.

The transducer may be an integrated handsfree transducer and the opening may be located at a side part of the hand-portable communications device.

The rear cavity may be sealed when the apparatus is in the second configuration.

The opening may connect the front cavity to the exterior of the housing directly. Alternatively the front cavity may be coupled to a third cavity, and the opening may couple the third cavity to the exterior of the housing.

The transducer may be an earpiece transducer and the opening may be located on a front main face of the hand-portable communications device.

The rear cavity may be sealed when the apparatus is in the second configuration.

A second aspect of the invention provides apparatus comprising:

housing means, the housing means comprising a first body part and a second body part, the first body part being moveable relative to the second body part, wherein the housing means has a first configuration when the first body part is in a first position relative to the second body part between and a second configuration when the first body part is in a second position relative to the second body part; and a speaker arrangement, wherein the speaker arrangement comprises:

transducer means, a front cavity coupled to the transducer, and an opening, the opening connecting the front cavity to an exterior of the housing, and a rear cavity coupled to a second side of the transducer, the second side of the transducer being on an opposite side of the transducer to the first side of the transducer, wherein the speaker arrangement has a first physical arrangement when the housing is in the first configuration and a second physical arrangement when the housing is in the second configuration, the first physical arrangement being different to the second physical arrangement.

DETAILED DESCRIPTION OF THE EMBODIMENTS

Figure 1:
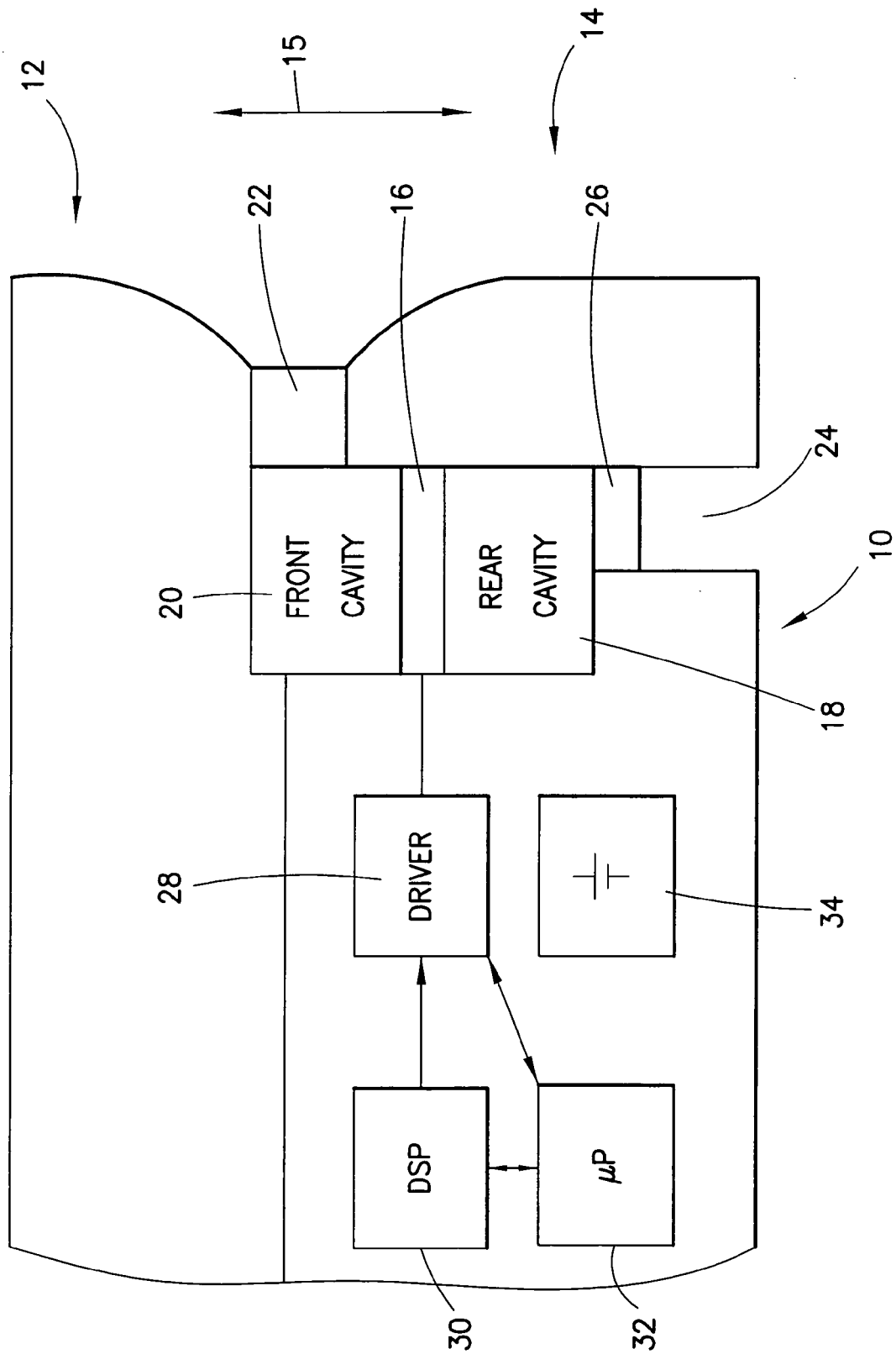
FIG. 1 is a schematic diagram of apparatus of various embodiments and is useful in understanding the present invention.

FIG. 1 illustrates apparatus according to various embodiments. The apparatus is denoted at 10 and comprises a housing having first and second body parts 12, 14. The first body part 12 is shown uppermost in the Figure. The second body part 14 is shown lowermost in the Figure.

The apparatus 10 in this example is a mobile telephone. FIG. 1 illustrates a schematic cross-section through an axis perpendicular to a longitudinal axis of the mobile telephone 10. Only a part of the cross-section is shown in the Figure—the phone extends for some distance leftwards of the part shown in the Figure. The first body part 12 constitutes an upper body part of the mobile telephone 10, and the second body part 14 constitutes a lower body part of the mobile telephone 10.

The upper and lower body parts 12, 14 are movable with respect to one another in the direction indicated by an arrow 15 in FIG. 1. The extent of movement of the first and second body parts 12, 14 relative to one another is limited in both directions. When the first and second body parts 12, 14 are moved apart from one another to a maximum extent, the mobile telephone 10 can be said to be in an open position. When the first and second body parts 12, 14 are moved together to a minimum extent of separation, the mobile telephone 10 can be said to be in a closed mode.

The mobile telephone 10 may be provided with a biasing arrangement (not shown in FIG. 1) such that the first and second body parts 12, 14 are amenable to being held such as to provide the open position of the mobile telephone 10 or the closed position of the mobile telephone 10 and such that the mobile telephone 10 is not amenable to being held in an intermediate position. This may be achieved in any suitable way. The mechanism for allowing movement of the first and second body parts 12, 14 relative to one another may take any suitable form, and is not shown in FIG. 1. The mechanism for allowing movement of the first and second body parts 12, 14 relative to one another may be operated by a user, or may be automatically operated in response to a command from a user or from software. Opening of the mobile phone 10 may occur for instance when a media file, such as an audio file, is opened by a user or by software.

A speaker arrangement comprises a number of components included in the mobile telephone 10. A transducer 16 is provided. The transducer 16 is located in a fixed relationship with the second body part 14. The transducer 16 may take any suitable form, for instance it may include an electromagnetic coil and diaphragm arrangement, or an electrostatic speaker transducer, or a piezo electric transducer, or any other suitable transducer. The transducer 16 includes a component with a surface, the component being movable in a direction generally perpendicular to the surface such that the transducer 16 causes pressurisation or movement of air. In the case of the transducer 16 being a moving coil transducer or an electrostatic transducer, the component is a diaphragm. For an or piezo transducer 16, the component may be a surface of a piezo element.

In direct communication with the transducer 16 is a rear cavity 18. The rear cavity 18 is a volume internal to the mobile telephone 10. The rear cavity 18 is formed as a void in the second body part 14. The rear cavity 18 may have any suitable shape, with aspects of the shape having respective dimensions. The rear cavity 18 may be sealed. The volume and the shape of the rear cavity 18 affect the frequency response of the speaker arrangement.

The rear cavity 18 may or may not include adsorbent material (not shown), and may or may not include one or more additional components (not shown). These one or more additional components may be unrelated to the operation of the speaker arrangement, and may instead be one or more components related to the operation of other aspects of the mobile phone 10. If one or more other components are included within the rear cavity 18, it can be advantageous if the impact of the one or more components on the acoustic response of the speaker arrangement is relatively small.

Movement of the moveable component of the transducer 16 results in the movement of air in the rear cavity 18. This can also be described as the radiation of sound waves into the rear cavity 18.

On the other side of the transducer 16 to the rear cavity 18 is a front cavity 20. The front cavity 20 may be formed entirely as a void in the second body part 14. Alternatively, the front cavity 20 may be formed in part by the second body part 14 and in part by the first body part 12.

The front cavity 20 has an internal volume. The front cavity 20 has an internal shape, with aspects of the shape having respective dimensions. The volume is defined by the configuration of the second body part 14, or by a combination of the configuration of the second body part 14 and the configuration of the first body part 12. The volume and the shape of the front cavity 20 affect the frequency response of the speaker arrangement. The front cavity 20 is in direct communication with the moveable component of the transducer 16. As such, mechanical vibration of the transducer 16 results in the movement of the air within the front cavity 20. This can also be described as the radiation of sound waves into the front cavity 20.

An opening 22 connects the front cavity 20 to the exterior of the mobile telephone 10. The opening 22 comprises one or more channels. The opening 22 is defined by the configuration of the second body part 14 and by the configuration of the first body part 12 Alternatively, the opening 22 may be defined solely by the second body part 14, or solely by the first body part 12. The opening 22 allows the movement of air between the front cavity 20 and the environment surrounding the mobile telephone 10. As such, sound is emitted through the opening 22.

The acoustic properties of the speaker arrangement depend on a number of factors. These factors include dimensions of the rear cavity 18, dimensions of the front cavity 20 and dimensions of the opening 22. Other factors include physical parameters of the transducer 16, and contributions provided by baseband electrical audio and digital signal processing.

According to various embodiments, dimensions of the rear cavity 18, dimensions of the front cavity 20 and/or dimensions of the opening 22 change as the mobile telephone 10 moves between open and closed configurations. The dimensions of the rear cavity 18 and/or the dimensions of the front cavity 20 and/or the dimensions of the opening 22 in the open configuration are different to the dimensions of the rear cavity 18 and/or the dimensions of the front cavity 20 and/or the dimensions of the opening 22 in the closed configuration. As such, moving the mobile telephone 10 between the open and closed configurations results in a change of the acoustic properties of the speaker arrangement. The acoustic properties in the open configuration are different to the acoustic properties in the closed configuration.

In example embodiments, the mobile telephone 10 includes a bass reflex port 24. The bass reflex port 24 comprises a channel between the rear cavity 18 and the exterior of the mobile telephone 10. The bass reflex port 24 is not permanently coupled with the rear cavity 18. Instead, a bass reflex port activation component 26 is interposed between the rear cavity 18 and the bass reflex port 24. In certain embodiments, the bass reflex port activation component 26 is controlled dependent on the locations of the first and second body parts 12, 14 relative to one another. For example, when the mobile telephone 10 is in the open position, in which the first and second body parts 12, 14 are separated to the maximum extent, the bass reflex port activation component 26 is in an open position, thereby providing direct communication between the rear cavity 18 and the bass reflex port 24. Also, when the mobile telephone 10 is in the closed position, in which the first and second body parts 12, 14 are at their minimum separation, the bass reflex port activation component 26 is closed, so that there is little or no communication between the rear cavity 18 and the bass reflex port 24.

Some of the electrical components of the mobile telephone 10 are shown in FIG. 1. In particular, the transducer 16 is shown as being driven by a driver 28. The mobile telephone 10 includes a digital signal processing (DSP) component 30. The mobile telephone 10 includes a microprocessor, or processor, 32. The electrical components of the mobile telephone 10 are powered by a battery 34. The driver 28 is in communication with the DSP 30 and with the microprocessor 32. Either the DSP 30 or the microprocessor 32 may control the driver to provide driving signals to the transducer 16 at any given time. The DSP 30 and/or the microprocessor 32 may adjust signals fed to the transducer 16, for instance by providing an equalizer function, gain control, dynamic range adjustment, excessive diaphragm movement prevention etc. The operation of the DSP 30 and/or the microprocessor 32 may improve performance of audio playback. Of course, alternative configurations are conceivable and are within the scope of this disclosure.

In different embodiments of the invention, variation of the acoustic properties of the speaker arrangement are adjusted in different ways. In each embodiment, there is adjustment of at least one of the dimensions of the front cavity 20, the dimensions of the opening 22, the dimensions of the rear cavity 18 and control of the bass reflex port activation component 26. In some embodiments, signals provided to the driver 28 by the DSP 30 and/or the microprocessor 32 are different depending on whether the mobile telephone 10 is in the open position or the closed position. In each embodiment, there is some adjustment in the physical arrangement of the speaker arrangement depending on whether the mobile telephone 10 is in the open position or the closed position.

Figure 2A:
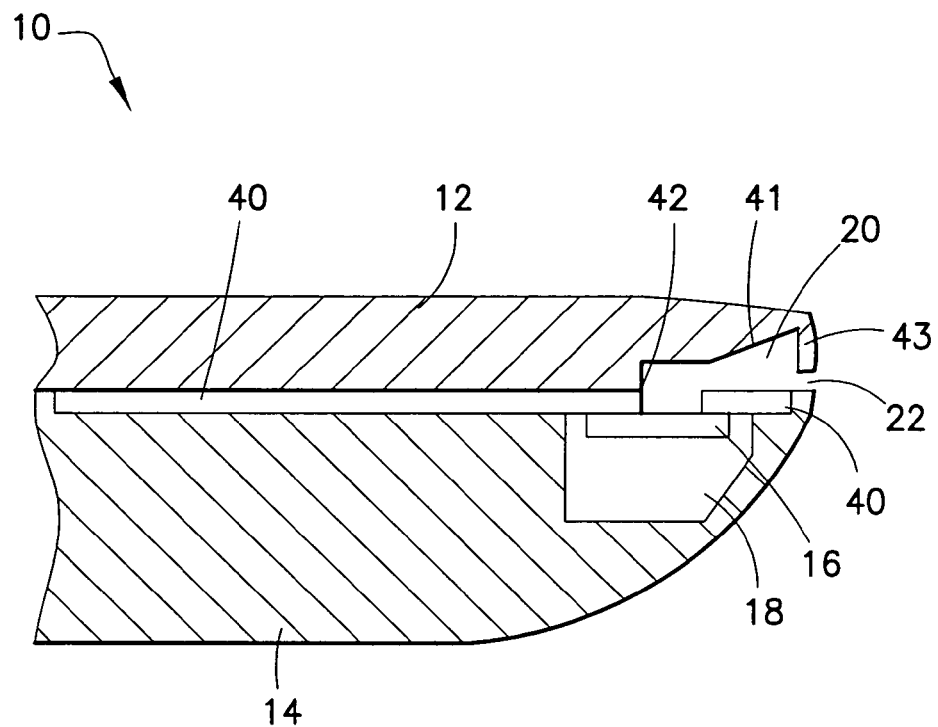
FIGS. 2A and 2B, collectively referred to as FIG. 2, are cross-sections through a first embodiment of apparatus according to the invention in closed and open positions respectively.
Figure 2B:
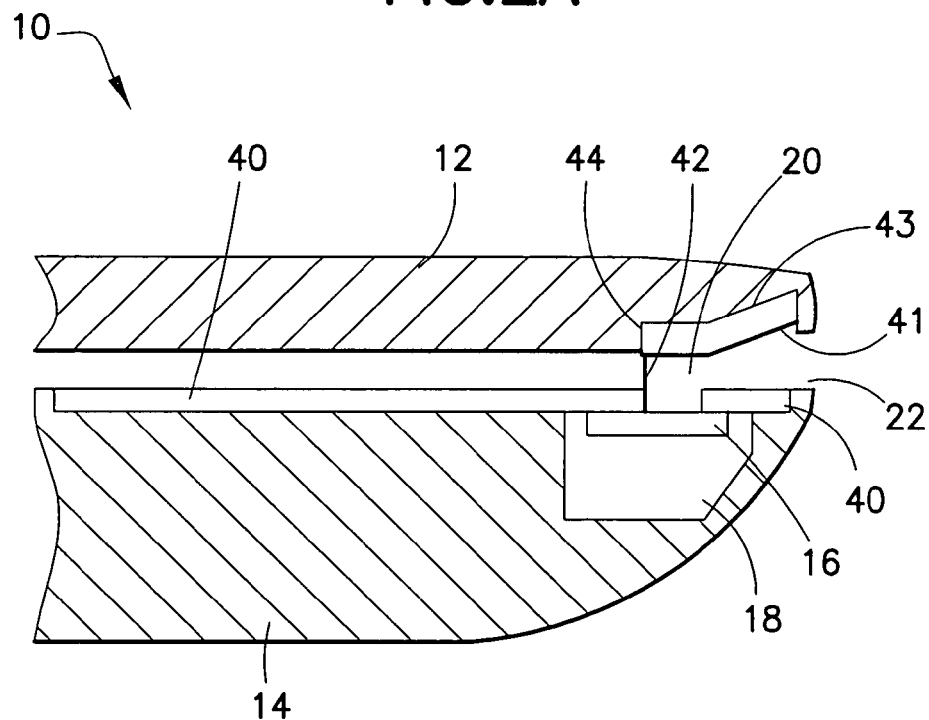

FIGS. 2A and 2B represent a first embodiment of the present invention. Reference numerals are retained from FIG. 1 for like elements.

As can be seen in FIGS. 2A and 2B, the first and second body portions 12, 14 are movable between a closed position, shown in FIG. 2A, and an open position, shown in FIG. 2B. A printed wire board (PWB) 40 forms part of the second body part 14, hereafter referred to as the lower body part. The PWB 40 forms the upper surface of the lower body part 14 for much of the cross section shown in FIGS. 2A and 2B. In the closed position, shown in FIG. 2A, the upper surface of the PWB 40 is in contact with the lower surface of the first body part 12, hereafter referred to as the upper body part. In the open position shown in FIG. 2B, there is an air gap between the upper surface of the PWB 40 and the lower surface of the upper body part 12. As with FIG. 1, in an open position, shown in FIG. 2B, the upper and lower body parts 12, 14 are separated to their maximum extent and in the closed position, shown in FIG. 2A, the upper and lower body parts 12, 14 are separated to their minimum extent.

A transducer 16 is connected in the lower body part 14. Beneath the transducer 16 in the Figure is shown a rear cavity 18. The rear cavity 18 is formed as a void in the lower body part 14. The rear cavity 18 also includes side walls (not shown). The shape of the rear cavity 18 may be relatively complex. The rear cavity may include one ore more components (not shown) and/or adsorbent material (not shown). The rear cavity 18 is in direct communication with the moveable component (not shown) of the transducer 16.

On the opposite side of the transducer 16 to the rear cavity 18 is a front cavity 20. The front cavity 20 is in direct communication with the moveable component (not shown) of the transducer 16. The front cavity 20 includes an upper wall 41 and a rear wall 42. The front cavity 20 also includes side walls (not shown). The shape of the front cavity 20 may be relatively complex. An opening 22 extends between the front cavity 20 and the external environment of the mobile phone 10.

The upper body part 12 has an upper internal surface 44 and a rear internal surface 45. As can best be seen from FIG. 2B, the upper and rear internal surfaces 44, 45 of the upper body part 12 have the same shape and configuration as the upper and rear walls 41, 42 of the front cavity 20. An effect of this is that the upper and rear walls 41, 42 of the front cavity 20 are in contact with the lowermost surface of the upper body part 12 when the mobile phone 10 is in the closed position, and there is an air gap between the upper and rear walls 41, 42 of the front cavity 20 and the upper and rear internal surfaces 44, 45 of the upper body part when the mobile phone 10 is in the open position.

An opening cover 43 is formed as part of the upper body part 12. The opening cover 43 moves with the upper body part 12, and so moves relative to the lower body part 14 when the mobile phone 10 is moved between the open and closed position.

In the embodiment of FIG. 2, the rear cavity 18 has the same volume and shape in the open position as it has in the closed position. Put another way, there is no change in the physical configuration of the rear cavity 18 as the mobile phone 10 moves between the open and closed positions.

Similarly, the volume and shape of the front cavity 20 is unchanged as the mobile phone 10 moves between the open and closed positions. This is due to the fact that the upper and rear walls 41, 42 of the front cavity are in a fixed relationship with the lower body part 14, and as such do not move as the mobile phone 10 is moved between the open and closed positions.

However, the physical configuration of the opening 22 changes as the mobile phone is moved between the open and closed positions. In particular, in the closed position, shown in FIG. 2A, the opening 22 has a relatively small dimension in the vertical direction shown in the Figure. As the upper and lower body parts 12, 14 are moved apart to the open position shown in FIG. 2B, the opening cover 43 moves with the first body part 12. As such, a gap between the lowermost extent of the opening cover 43 and the uppermost surface of the corresponding part of the lower body part 14 increases. Put another way, the vertical dimension shown in FIG. 2B increases as the upper and lower body parts 12, 14 are moved apart from one another. As well as the vertical dimension increasing as the mobile phone 10 is moved from the closed to the open position, the area of the opening 22 increases.

A dimension of the opening 22 in a direction perpendicular to the plane of FIGS. 2A and 2B may have any suitable value. For instance, the opening 22 may have a dimension in the perpendicular direction approximately equal to the dimension in the vertical direction. Alternatively, the dimension in the perpendicular direction may be significantly greater than the dimension in the vertical dimension when the mobile phone 10 is in the closed position. In this form, the opening 22 may take the form of an elongate slit when in the closed position and in the form of a wider elongate slit when the mobile phone 10 is in the open position. Further alternatively, there may be plural openings 22 formed within the mobile phone 10. The plural openings 22 may be formed in a line in a direction perpendicular to FIGS. 2A and 2B, e.g. along one side of the mobile phone 10. In this case, the opening cover 43 may partially cover plural ones of the openings 22, and the physical configurations of the openings 22 may be changed simultaneously as the mobile phone 10 is moved between the open and closed positions. In this case, each of the openings 22 is connected directly with the front cavity 20, and acoustic properties of the speaker arrangement are dependent on the physical characteristics of all of the openings 22.

It will be appreciated by the skilled person that the embodiment of FIG. 2 provides for different acoustic characteristics of the speaker system in the open and closed positions. In particular, a frequency of Helmholtz resonance of the speaker system is increased as the mobile phone is moved from the closed position, shown in FIG. 2A, to the open position, shown in FIG. 2B. The physical configurations of the front cavity 20 and the opening or openings 22 in the closed position may be chosen such that a significant resonant frequency of the speaker arrangement is of the order of a few kHz. In this way, the speaker arrangement may provide a particularly loud acoustic signal at frequencies near to those used by ringtones. Put another way when the mobile phone 10 is in the closed position, shown in FIG. 2A, it will provide a louder output when the transducer 16 is provided with a varying electrical signal comprising a ringtone with dominant sound components at suitable frequencies. Here, the upper peak resonance frequency may be between 3 kHz and 5 kHz, for instance around 4 kHz.

The enlargement of the opening 22 as the mobile phone 10 is moved to the open position, shown in FIG. 2B, increases the frequency of Helmholtz resonance of this arrangement to a suitably higher frequency. For instance the higher frequency may be greater than 5 kHz. In this way, the speaker arrangement is provided with a greater bandwidth. Additionally, the speaker arrangement is provided with a more flat frequency response at frequencies that are more of interest when reproducing music and wideband speech. Although the acoustic energy of acoustic signals emitted by the mobile phone 10 when in the open position, shown in FIG. 2B, may be reduced at the upper resonant frequency present when the mobile phone 10 is in the closed position, the user may experience a better quality by virtue of the greater bandwidth and the flatter frequency response.

Figure 3A:
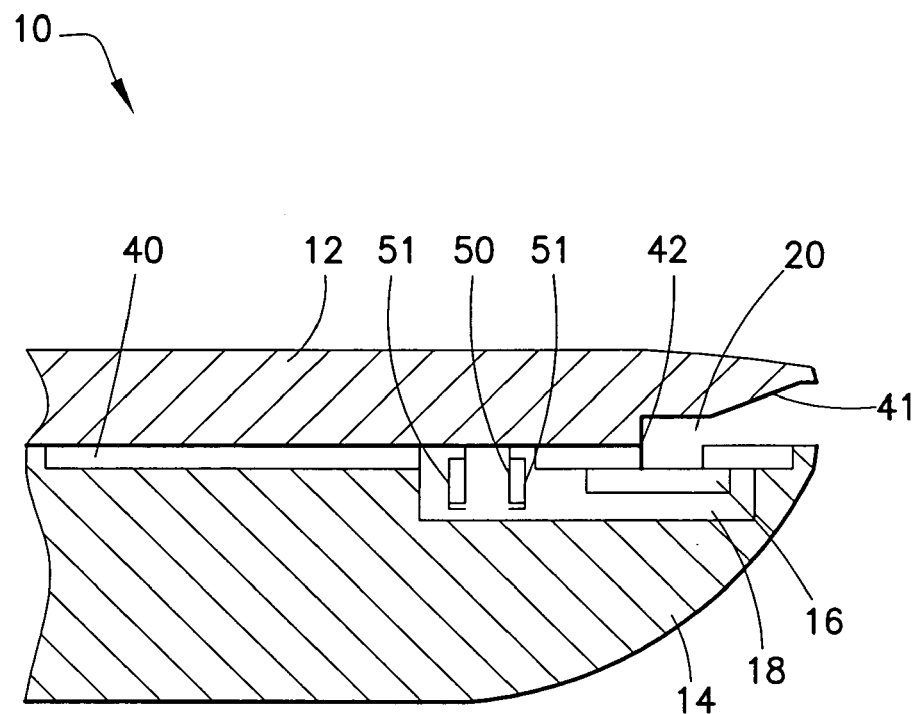
FIGS. 3A and 3B, collectively referred to as FIG. 3, are cross-sections through a second embodiment of apparatus according to the invention in closed and open positions respectively.
Figure 3B:
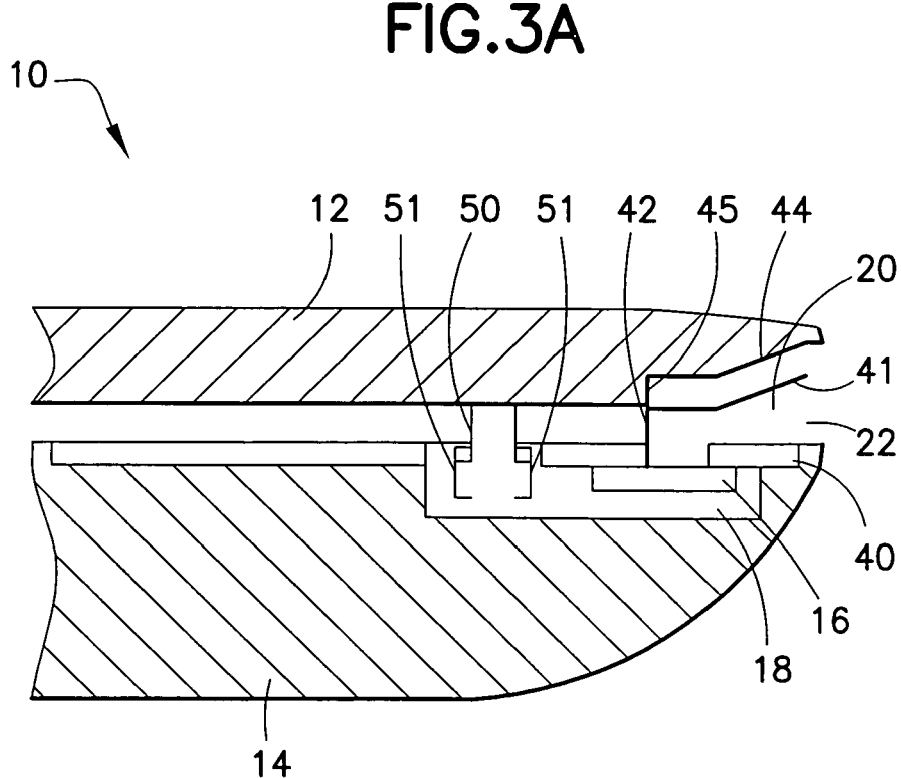

A second embodiment of a mobile phone in accordance with the invention is shown in FIGS. 3A and 3B. Reference numerals are obtained from previous Figures for like elements. In FIG. 3A, the mobile telephone in a closed position, and in FIG. 3B, the mobile phone 10 is in an open position.

The rear cavity 18 of the mobile phone 10 has a different physical configuration to the rear cavity 18 of the FIG. 2 embodiment. In FIG. 3, the rear cavity 18 has less depth, i.e. is shallower, than in the FIG. 2 arrangement. Additionally, the rear cavity 18 of FIG. 3 is wider, in the sense that it extends for a greater distance in the horizontal dimension in the Figure, than does the rear cavity 18 of the FIG. 2 embodiment.

Provided in a fixed relationship with the lower body part 14 is an outer tube 51. The outer tube 51 extends in a generally vertical direction in the Figure. The outer tube 51 is provided with inwardly projecting flanges at its upper and lower ends. The outer tube 51 is supported left of the position of the transducer 16 in the Figure. An uppermost extent of the outer tube 51 is shown as nearly contacting an upper surface of the lower body part 14. Instead, the uppermost part of the outer tube 51 could be contacting the upper surface of the lower body part 14, or may be constituted by the uppermost surface of the lower body part 14.

An inner tube 50 is provided concentrically within the outer tube 51. The uppermost end of the inner tube 50 is attached to the lowermost surface of the upper body part 12 in sealed manner. The inner tube 50 includes an outwardly extending flange at a lowermost end.

A gap between the lowermost inwardly extending flange of the outer tube 51 and a bottom surface of the rear cavity 18 provides a passage for the movement of air into and out of a volume provided by the inner and outer tubes 50, 51. As such, the internal volume of the inner tube 50 forms part of the volume of the rear cavity 18. As a result of this, the volume of the rear cavity 18 when the mobile phone 10 is in the open position is greater than the volume of the rear cavity 18 when the mobile phone 10 is in the closed position.

The outwardly extending flange of the inner tube 50 is provided with an external dimension such as to closely fit an internal dimension of the outer tube 51. The outwardly extending flange of the inner tube 50 is provided in the region between the inwardly extending flanges of the outer tube 51. As such, the inwardly extending flanges of the outer tube 51 may serve to limit movement of the inner tube 50 relative to the outer tube 51. Alternatively, the inwardly extending flanges may be omitted.

An outer dimension of the inner tube 50 is approximately the same as an internal dimension of the uppermost inwardly extending flange of the outer tube 51. In this way, a relatively tight fit is provided between the inner and outer tubes 50, 51.

One or more gaskets (not shown) may be provided between the inner and outer tubes 50, 51 in the region between the uppermost inwardly extending flange of the outer tube 51 and the outwardly extending flange of the inner tube 50.

The outer surface of the inner tube 50 is closely fitting with an aperture at the uppermost surface of the lower body part 14. As such, the internal volume of the rear cavity, including the internal volume of the inner tube 50, is sealed from the external environment of the mobile phone 10. The presence of gaskets between the inner and outer tubes 50, 51 may provide an enhanced seal.

Alternatively, the mobile phone 10 may be arranged such that air can pass between the external environment of the mobile phone 10 and the volume constituted by the rear cavity 18 and the internal volume of the inner tube 50. In this way, movement of the mobile phone 10 between the open and the closed positions may not alter the pressure within the rear cavity 18. However, any leak channel or aperture allowing the passing of air between the rear cavity 18 and the external environment of the mobile phone 10 might have a negative effect on acoustic properties of the speaker arrangement. However, if the leak channel is tuned (or, put another way, under control), then the system may efficiently work well. Tuning may involve the use of a bass reflex, so that the rear cavity 18 is ported in addition to the front cavity 20.

In further embodiments there is not a dedicated rear cavity but instead the internal volume of the second body part 14 of the mobile phone 10 is sealed. These embodiments may give rise to the largest possible volume for the cavity at the rear of the transducer 16.

Whether or not the rear cavity 18 is sealed, the subjective performance of the speaker arrangement is improved in the open position because of the greater volume of the rear cavity 18 at least in that the effective loudness of audio playback increases with the increased volume of the rear cavity. Furthermore, the greater cavity volume can give rise to an additional advantageous effect of wider bandwidth.

It will be appreciated that the physical configuration of the rear cavity, incorporating the internal volume of the inner tube 50, is different in the closed configuration, shown in FIG. 3A, than it is when in the open configuration, shown in FIG. 3B.

It will be appreciated that the bass response is improved in the open position compared to in the closed position. The bass response is improved in the sense that the increased volume in the open position provides a reduction in the resonant frequency, thereby giving rise to louder acoustic signals at bass frequencies.

Although the tube 50 is described as being circular in cross-section, it will be appreciated that it may take any suitable form.

Figure 4A:
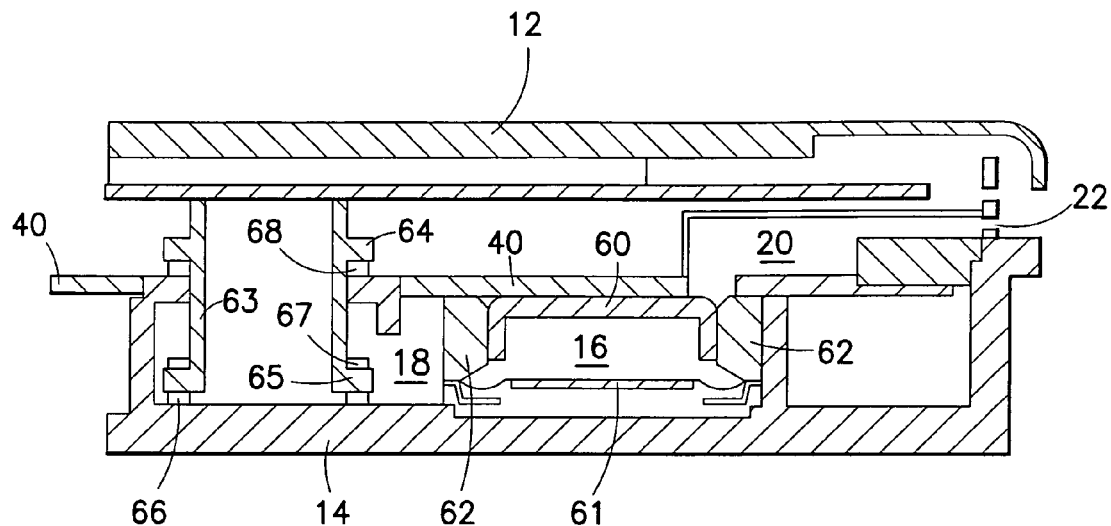
FIGS. 4A and 4B, collectively referred to as FIG. 4 are cross-sections through a third embodiment of apparatus according to the invention in closed and open positions respectively.
Figure 4B:
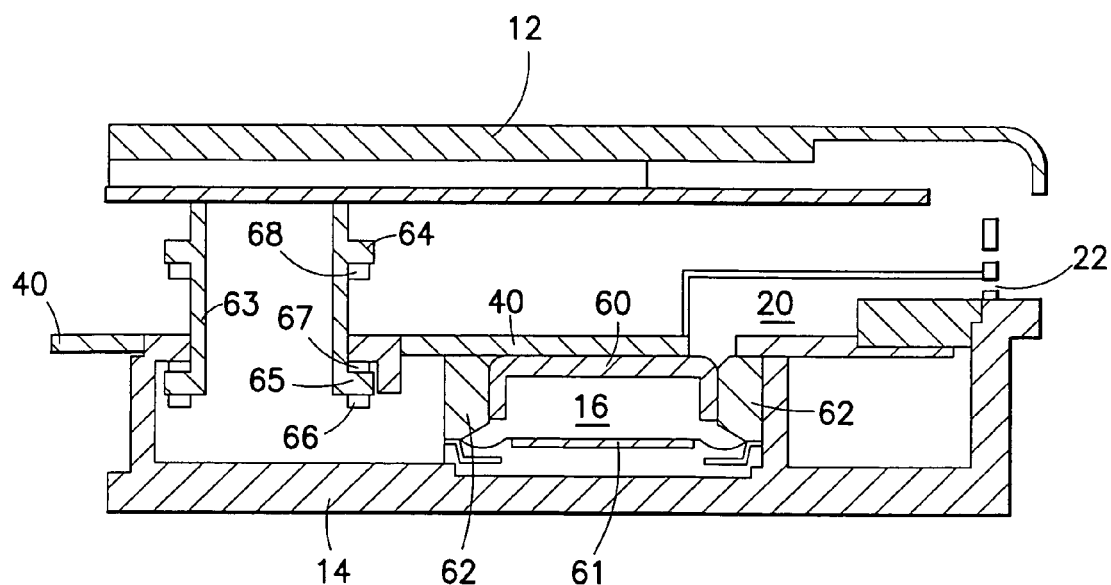

A third embodiment of a mobile phone in accordance with the invention is shown in FIGS. 4A and 4B. Reference numerals are obtained from previous Figures for like elements. In FIG. 4A, the mobile telephone in a closed position, and in FIG. 4B the mobile phone 10 is in an open position. The mobile phone of FIG. 4 operates on a similar principle to that of FIG. 3. However, the mobile phone 10 of FIG. 4 has a configuration that is quite different to that of the mobile phone 10 of FIG. 3.

In FIG. 4, the transducer 16 is shown to comprise a magnet 60, a diaphragm 61 and a frame 62. The magnet 60 together with a coil (not shown) causes the diaphragm to reciprocate in a vertical direction in the Figure upon application of an electrical signal. The frame allows air to move between the uppermost surface of the diaphragm 61 and the front cavity 20. The front cavity 20 is connected with the rear cavity 18 only via the diaphragm 61. The front cavity 20 is connected to the atmosphere external to the mobile phone 10 by an opening 22.

In FIG. 4, the rear cavity 18 is formed beneath a PWB 40 within a second body part 14 and by a part of the housing forming the second body part 14.

A tube 63 is arranged vertically. The tube 63 is fixed at its uppermost end to the first body part 12 in a sealed manner. The tube 63 is open at its lowermost end. The tube extends through a circular aperture in the second body part 14 such that the lowermost end is located within the rear cavity 18. A first flange 64 extends around the outside circumference of the tube 63 at a position approximately three quarters of the way along the tube, nearest the uppermost end of the tube 63. A second flange 65 extends around the outside circumference of the tube 63 at the lowermost end of the tube 63.

Gaskets seal the rear cavity 18 when in the open and closed positions. In particular, a first gasket 66 is located on a lower surface of the second flange 65. Also, a second gasket 67 is provided on an upper surface of the second flange 65. Lastly, a third gasket 68 is provided on a lower surface of the first flange 64. The gaskets 66-68 are generally annular in shape. Uppermost and lowermost surfaces of the gaskets 66-68 are generally planar. This allows the gaskets 66-68 to form good seals with horizontal planar surfaces into which they are brought in contact.

The gaskets 66-68 are compressed when operational, and can be made of any suitable material. Alternatively, the gaskets may not be separate entities but may instead be formed by treating, for instance by gluing or heat staking, the flanges 64, 65 or other suitable parts of the mobile phone 10.

In the closed position, shown in FIG. 4A, the first gasket 66 seals the interior of the tube 63 from the rear cavity 18 by contacting the floor of the cavity 18. As such, in the closed position, air is prevented from being able to move between the rear cavity 18 and the interior of the tube 63. As such, the interior volume of the tube 63 does not form part of the volume of the rear cavity 18 when in the closed position, Thus, in the closed position, the rear cavity 18 has a relatively small volume, compared to the volume of the rear cavity 18 when the mobile phone 10 is in the open position. In the closed position, the third gasket 68 contacts the uppermost surface of the second body part 14. This provides a seal to prevent the movement of air between the rear cavity 18 and the environment external to the mobile phone 10.

In the open position, shown in FIG. 4B, the second gasket 67 contacts the downwardly facing surface of the second body part 14 that is opposite to the surface of the body part 14 that was contacted by the third gasket 68 when in the closed position. This provides a seal to prevent the movement of air between the rear cavity 18 and the environment external to the mobile phone 10. In the open position, the lower end of the tube 63 is separated from the floor of the second body part 14, and air is able to move into the interior volume of the tube. In the open position, the rear cavity 18 is comprised of the volume of the rear cavity 18 when the mobile phone was in the closed position and the internal volume of the tube 63. As such, the rear cavity 18 has a relatively large volume, compared to the volume of the rear cavity 18 when the mobile phone 10 is in the closed position. The increase in volume is dependent primarily on the diameter and length dimensions of the tube 63.

It will be appreciated that the bass response is improved in the open position compared to in the closed position. The bass response is improved in the sense that the increased volume of the rear cavity 18 in the open position provides a lower resonant frequency, thereby giving rise to wider bandwidth signals, or, put another way, higher amplitude signals at low, bass frequencies. These effects are achieved without any changes to the rest of the audio playback system including digital signal processing.

Although the tube 63 is described as being circular in cross-section, it will be appreciated that it may take any suitable form.

Alternatively, the mobile phone 10 may be provided with a small leak channel such that air can pass between the external environment of the mobile phone 10 and the volume constituted by the rear cavity 18 and the internal volume of the inner tube 50. In this way, movement of the mobile phone 10 between the open and the closed positions may not alter the pressure within the rear cavity 18. However, any leak channel or aperture allowing the passing of air between the rear cavity 18 and the external environment of the mobile phone 10 might have a negative effect on acoustic properties of the speaker arrangement. However, if the leak channel is tuned (or, put another way, under control), then the system may efficiently work well. Tuning may involve the use of a bass reflex or a pressure equalizing leak, so that the rear cavity 18 is ported in addition to the opening from the front cavity 20.

In further embodiments there is not a dedicated rear cavity but instead the internal volume of the second body part 14 of the mobile phone 10 is sealed. These embodiments may give rise to the largest possible volume for the cavity at the rear of the transducer 16.

Whether or not the rear cavity 18 is sealed, the subjective performance of the speaker arrangement is improved in the open position because of the greater volume of the rear cavity 18 at least in that the effective loudness and bandwidth of audio playback increases with the increased volume of the rear cavity.

Figure 5A:
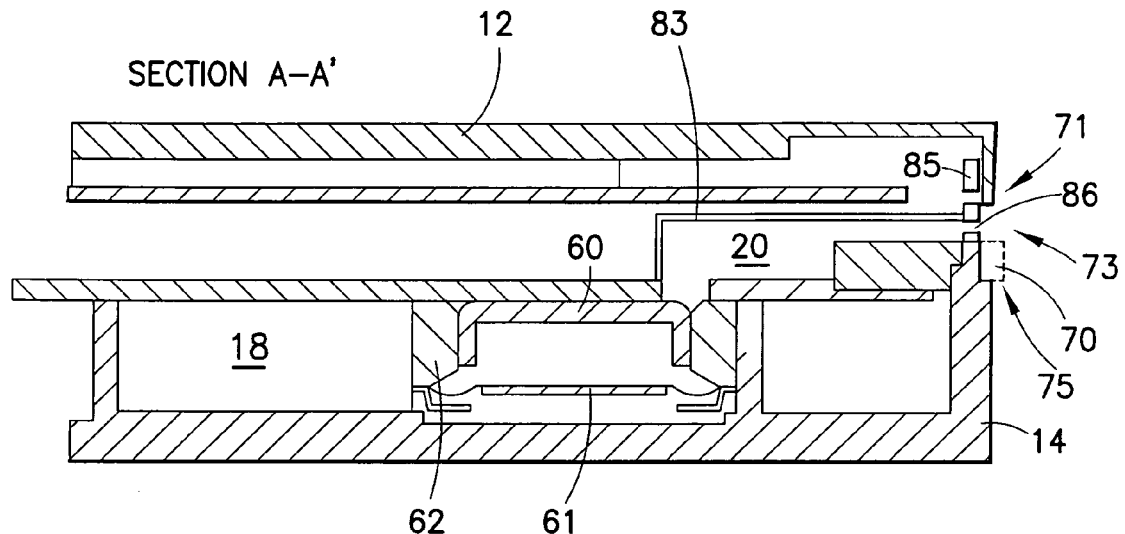
FIGS. 5A and 5B are a first cross-section through a fourth embodiment of apparatus according to the invention in closed and open positions respectively.
Figure 5B:
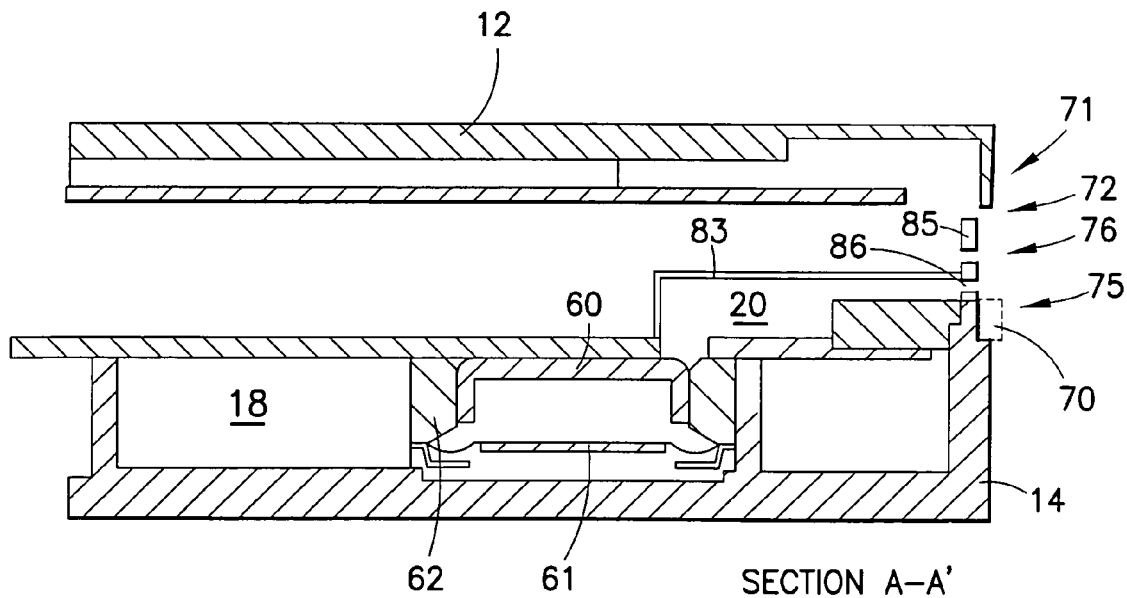
Figure 5C:
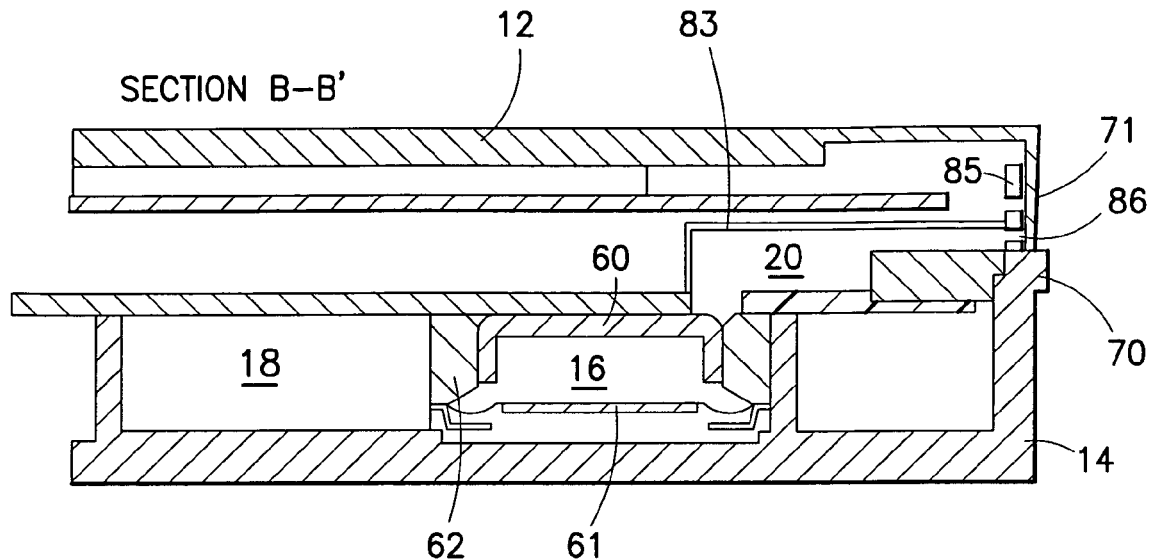
FIGS. 5C and 5D are a second cross-section through the fourth embodiment of apparatus according to the invention in closed and open positions respectively.
Figure 5D:
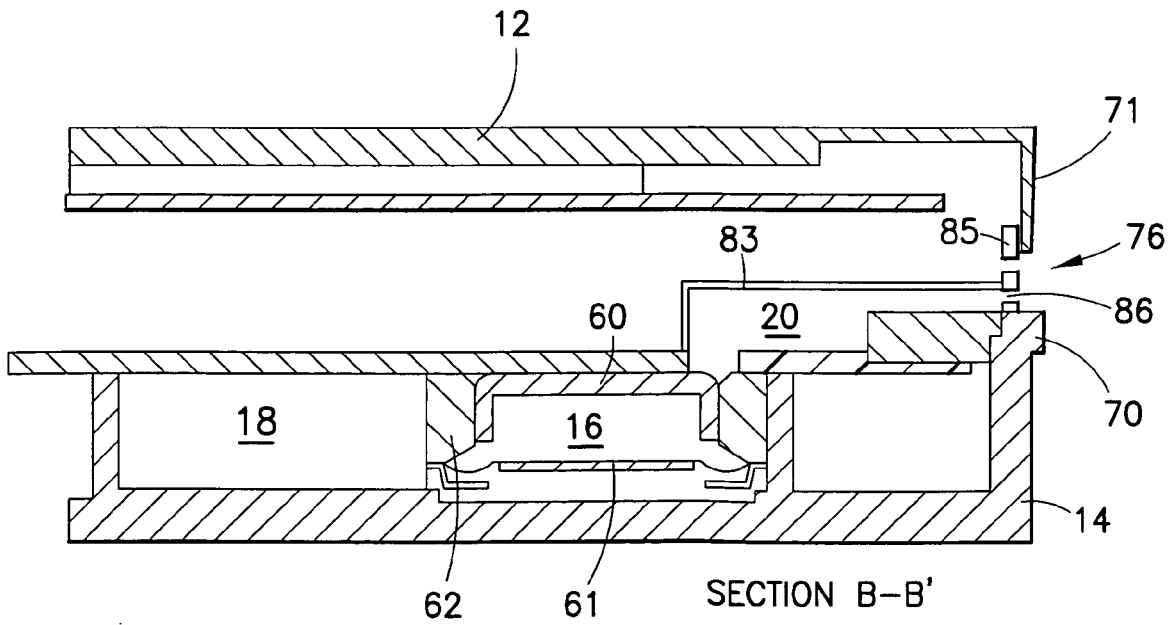
Figure 5E:
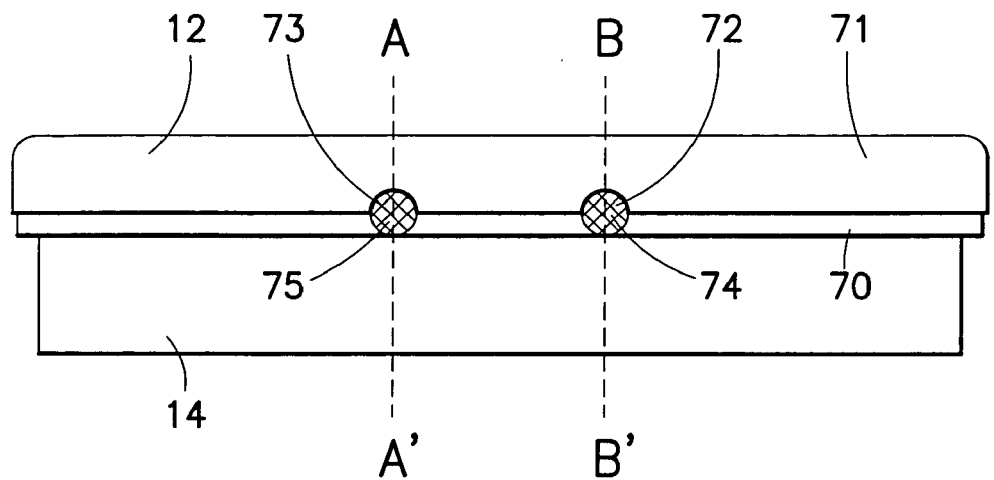
FIGS. 5E and 5F are end views of the fourth embodiment of apparatus according to the invention in closed and open positions respectively.
Figure 5F:
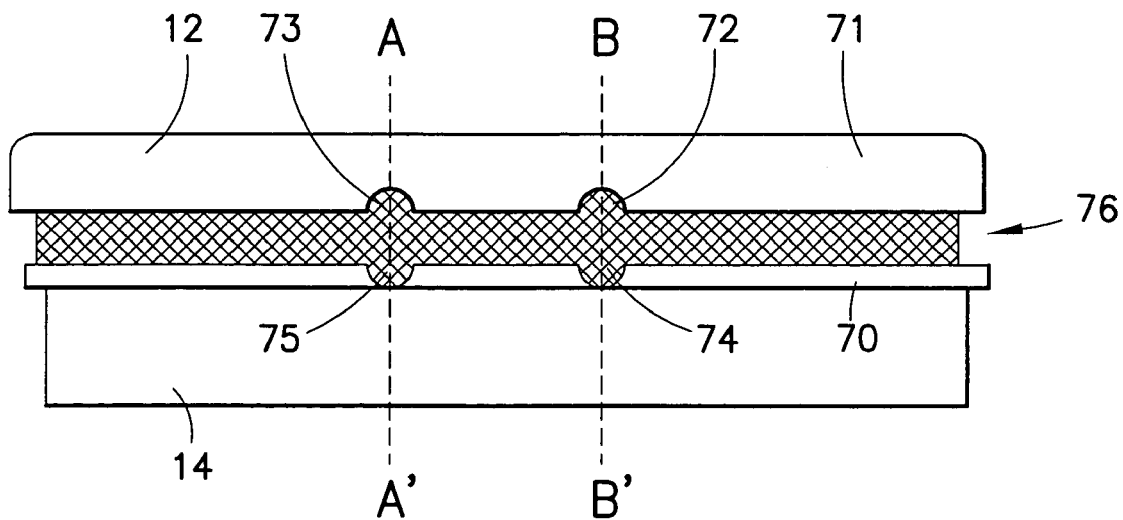

FIGS. 5A, 5B, 5C, 5D, 5E and 5F collectively referred to as FIG. 5, relate to a fourth embodiment of the invention. FIGS. 5A and 5B are a first cross-section in closed and open positions respectively, FIGS. 5C and 5D are a second cross-section in closed and open positions respectively, and FIGS. 5E and 5F are end views in closed and open positions respectively. FIGS. 5A and 5B relates to the cross-section A-A' and FIGS. 5C and 5D relate to the cross-section B-B' shown in FIGS. 5E and 5F.

The transducer 16 is shown to comprise a magnet 60, a diaphragm 61 and a frame 62. The magnet 60 together with a coil (not shown) causes the diaphragm to reciprocate in a vertical direction in the Figure upon application of an electrical signal.

As can be seen in FIG. 5, the first body part 12 includes a skirt 71. The skirt 71 extends around the end of the first body part 12, as can best be seen in FIGS. 5E and 5F. The second body part 14 includes a lip 70. The lip 70 extends around the end of the second body part 14, as can best be seen in FIGS. 5E and 5F. For most of their length, the lip 70 and the skirt 71 meet when the mobile phone 10 is in the closed position, as is best seen in FIG. 5E. Within the lower part of the skirt 71 are two skirt cut-outs 72, 73. The skirt cut outs 72, 73 are hemispherical in shape, with their open ends pointing downwards. Within the lower part of the lip 70 are formed are two lip cut-outs 74, 75. The lip cut outs 74, 75 are hemispherical in shape, with their open ends pointing upwards. The lip cut outs 74, 75 are adjacent the skirt cut outs 72, 73. As such, they form circular apertures in the end of the first body part 12 when the mobile phone 10 is in the closed position, as is best seen in FIG. 5E. The lip cut out 75 is present in FIGS. 5A and 5B by the absence of material; shown in the Figure is the part of the lip 70 that is behind the cut out through the cross-section.

When the mobile phone 10 is in the open position, the first and second body parts 12, 14 are further separated. Here, a gap, slot or crevice 76 is formed between the skirt 71 and the lip 70, and the lip cut outs 74, 75 are separated from the skirt cut outs 72, 73.

A wall 85 is attached to and extends upward from the upper surface of the second body part 14, in particular the lip 70. The first wall 85 extends for the width of the mobile phone 11, which extends in the direction perpendicular to the Figure. The first wall 85 has a thickness, which extends horizontally in the Figure. The first wall 85 is arranged to abut the open end of the front cavity 20.

An aperture 86 is formed in the first wall 85. The aperture 86 may be plural holes arranged in a line extending in the direction perpendicular to the Figure. The aperture 86 may instead be a one or more slits arranged in a line extending perpendicular to the Figure. Each hole or slit forming the aperture 86 may have a smallest diameter of 0.9 mm. For a circular hole, this provides a minimum area of about 0.6 mm$^2$.

An effect of the aperture 86 is to form a component of the opening 22 of the front cavity 20. The aperture 86 extends for tens of mm along the front wall 85 in the direction perpendicular to the Figure. That is, a line or holes or slits extends for tens of mm along the front wall 85 in the direction perpendicular to the Figure. It is described below that the width of the opening 22 is different depending on whether the mobile phone 10 is in the open or closed position.

The skirt 71 abuts the wall 85 in the sense that the two components are located close together.

A roof component 83 forms a roof for the front cavity 20. A part of the front cavity 20 that leads to the aperture 86 has a dimension of tens of mm in the direction perpendicular to the Figure. In the vertical dimension in the Figure, the part of the front cavity 20 that leads to the aperture 86 may have a height of between 1 mm and 3 mm.

It will be appreciated that in the closed position the circular apertures formed by the cut outs 72-75 form the primary channel connecting the aperture 86 to the environment external to the mobile phone 10. Put another way, the circular apertures formed by the cut outs 72-75 form part of the opening 22 in the closed position. The parts of the aperture 86 that do not coincide with the circular apertures formed by the cut outs 72-75 do not form part of the opening 22 when in the closed position.

In the open position the crevice 76 exposes more of the width, and thus area, of the aperture 86 to the environment external to the mobile phone. Since the width of the aperture 86, and thus the area of the aperture 86, varies, the physical configuration of the opening 22 changes as the mobile phone is moved between the open and closed positions. In particular, the area of the opening 22 is significantly larger when the mobile phone 10 is in the open position than when it is in the closed position. The volumes of the front and rear cavities 18, 20 remain unchanged.

It will be appreciated by the skilled person that the embodiment of FIG. 5 provides for different acoustic characteristics of the speaker system in the open and closed positions. In particular, an upper resonance frequency of the speaker system is increased as the mobile phone 10 is moved from the closed position to the open position. The physical configurations of the front cavity 20 and the opening or openings 22 in the closed position may be chosen such that a significant resonant frequency of the speaker arrangement is of the order of a few kHz, for instance between 3 kHz and 5 kHz, for instance around 4 kHz. In this way, the speaker arrangement may provide a particularly loud acoustic signal at frequencies near to those used by ringtones. Put another way when the mobile phone 10 is in the closed position, shown in FIG. 2A, it will provide a louder output when the transducer 16 is provided with a varying electrical signal comprising a ringtone with dominant sound components at suitable frequencies. Here, the peak resonance frequency may be between 3 kHz and 4 kHz, for instance around 3.5 kHz.

The enlargement of the area of the opening 22 as the mobile phone 10 is moved to the open position increases the frequency of Helmholtz resonance of this arrangement to a suitably higher frequency. For instance the higher frequency may be greater than 5 kHz. In this way, the speaker arrangement is provided with a greater bandwidth. Additionally, the speaker arrangement is provided with a more flat frequency response at frequencies that are more of interest when reproducing music and wideband speech. Although the acoustic energy of acoustic signals emitted by the mobile phone 10 when in the open position, shown in FIG. 2B, may be reduced at the upper resonant frequency present when the mobile phone 10 is in the closed position, the user may experience a better quality by virtue of the greater bandwidth and the flatter frequency response. The frequency response may be flattened further by the use of digital signal processing.

Figure 6A:
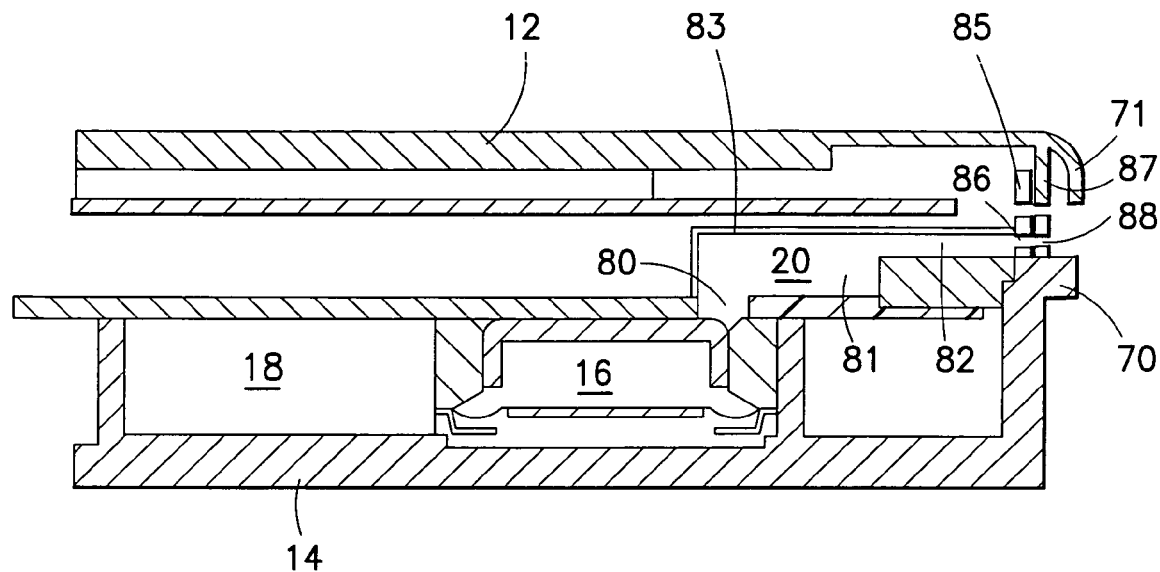
FIGS. 6A and 6B are cross-sections through a fifth embodiment of apparatus according to the invention in closed and open positions respectively.
Figure 6B:
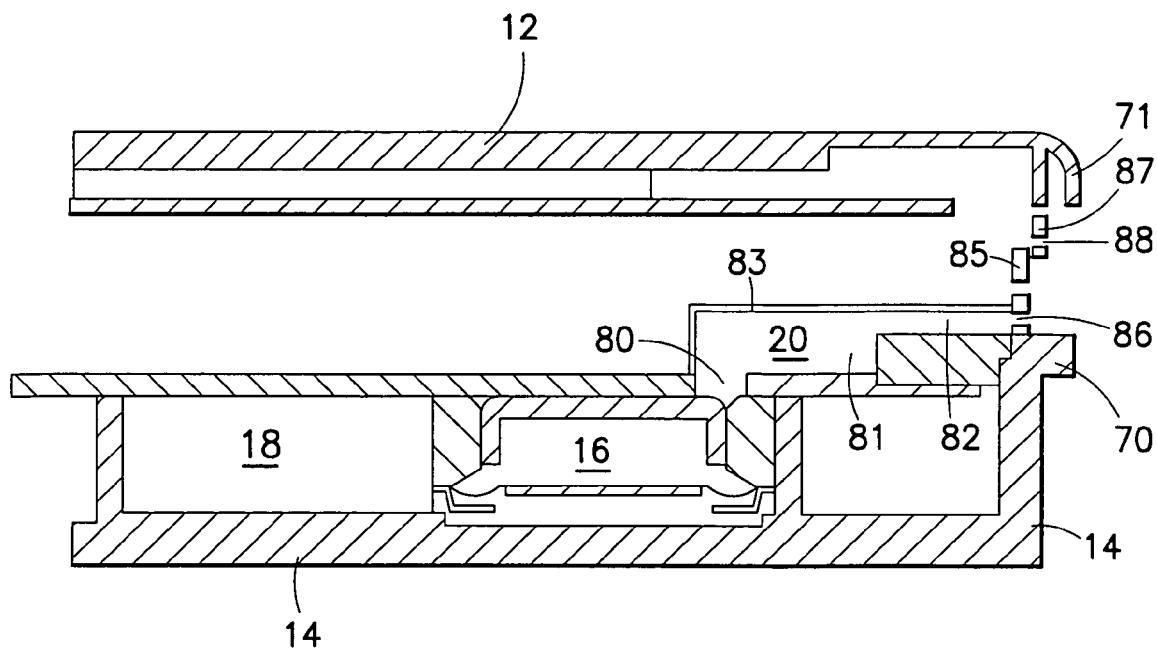

FIGS. 6A and 6B are cross-sections through to a fifth embodiment of apparatus according to the invention in closed and open positions respectively. Reference numerals are retained from previous Figures for like elements.

The transducer 16 is shown to comprise a magnet 60, a diaphragm 61 and a frame 62. The magnet 60 together with a coil (not shown) causes the diaphragm to reciprocate in a vertical direction in the Figure upon application of an electrical signal.

The mobile phone 10 of FIG. 6 includes a lip 70 and a skirt 71 similarly to the FIG. 5 embodiment. However, the skirt 71 is configured such that it does not abut the upper surface of the lip 70 when in the closed position but instead leaves a gap between the skirt 71 and the lip 70. Additionally the skirt 71 is separated from a first wall 85.

The first wall 85 is attached to and extends upward from the upper surface of the second body part 14, in particular the lip 70. The first wall 85 extends for the width of the mobile phone 11, which extends in the direction perpendicular to the Figure. The first wall 85 has a thickness, which extends horizontally in the Figure. The first wall 85 is arranged to abut the open end of the third front cavity section 82. An aperture 86 is formed in the first wall 85. The aperture 86 may be a slit or hole, extending in the direction perpendicular to the Figure. The aperture 86 may instead be a plurality of slits or holes arranged in a line perpendicular to the Figure. Each slit or hole may have an area of 0.6 mm$^2$ or more. An effect of the aperture 86 is to form a part of the opening 22 of the front cavity 20.

A second wall 87 is attached to and extends downward from a downwardly facing surface of the first body part 12. In particular, the second wall 87 extends downwardly from a position behind the top of the skirt 71. The second wall 87 extends for the width of the mobile phone 11, which extends in the direction perpendicular to the Figure. The second wall 87 has a thickness, which extends horizontally in the Figure. The innermost surface of the second wall 87 is arranged to abut or otherwise to be in close proximity to the outermost surface of the first wall 85. An aperture 88 is formed in the second wall 87. The aperture 88 may be a slit, extending in the direction perpendicular to the Figure. The aperture 88 may instead be a plurality of slits arranged in a line perpendicular to the Figure. An effect of the aperture 88 is to form a part of the opening 22 of the front cavity 20 when the mobile phone 10 is in the closed position.

In the closed position, shown in FIG. 6A, the aperture 88 in the second wall 87 coincides with the aperture 86 in the first wall 85. As such, the apertures 86 and 88 cooperate to form a channel connecting the third section 82 of the front cavity 20 to the environment surrounding the mobile phone 10. When the mobile phone 10 is in the closed position the length of the opening 22 incorporates the thickness of the first and second walls 85, 87.

In the open position, shown in FIG. 6B, the second wall 87 has been moved away from the aperture 86 in the first wall 85. As such, in the open position the second wall 87 does not contribute to the dimensions of the opening 22. Instead, only the aperture 86 in the first wall 85 contributes to the physical configuration of the opening 22. Put another way, the physical configuration of the opening 22 is different depending on whether the mobile phone 10 is in the open position or the closed position.

It will be appreciated that a Helmholtz resonant frequency is different in the open and closed positions because of the different opening lengths. In particular, the Helmholtz resonant frequency is higher in the open position than it is in the closed position because the mass of air in the neck of the Helmholtz resonator formed by the front cavity 20 when the opening 22 is longer in the closed position is greater than the mass in the neck formed by the opening 22 when the opening 22 is shorter in the open position.

The shorter opening 22 when the mobile phone 10 is in the open position increases the frequency of Helmholtz resonance of this arrangement to a significantly higher frequency. For instance the higher frequency may be greater than 5 kHz. In this way, the speaker arrangement is provided with a greater bandwidth. Additionally, the speaker arrangement is provided with a more flat frequency response at frequencies that are more of interest when reproducing music and wideband speech. Although the acoustic energy of acoustic signals emitted by the mobile phone 10 when in the open position, shown in FIG. 2B, may be reduced at the upper resonant frequency present when the mobile phone 10 is in the closed position, the user may experience a better quality by virtue of the greater bandwidth and the flatter frequency response.

In other embodiments (not shown in the Figures) a mobile phone 10 is provided with features that result in a opening 22 in the open position that is shorter and has a greater area than the opening when in the closed position. For instance, these embodiments may incorporate the opening length adjusting features of FIG. 6 and the opening area adjusting features of FIG. 2 or FIG. 6. These embodiments provide a highest resonant frequency that is greater than that provided by a corresponding arrangement with only one of the frequency increasing arrangements. For instance, the upper resonant frequency of such an arrangement may be between 6 to 12 kHz, for instance between 8 and 10 kHz.

Figure 7A:
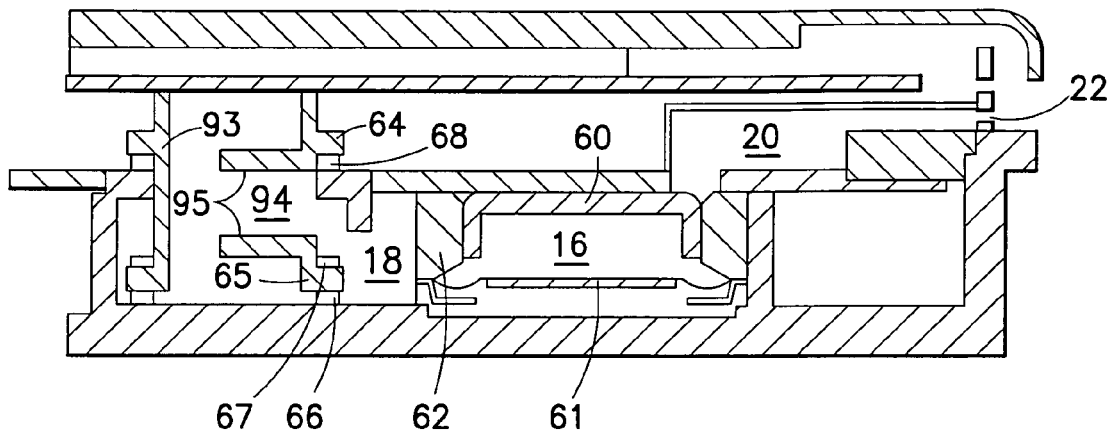
FIGS. 7A and 7B are cross-sections through a sixth embodiment of apparatus according to the invention in closed and open positions respectively.
Figure 7B:
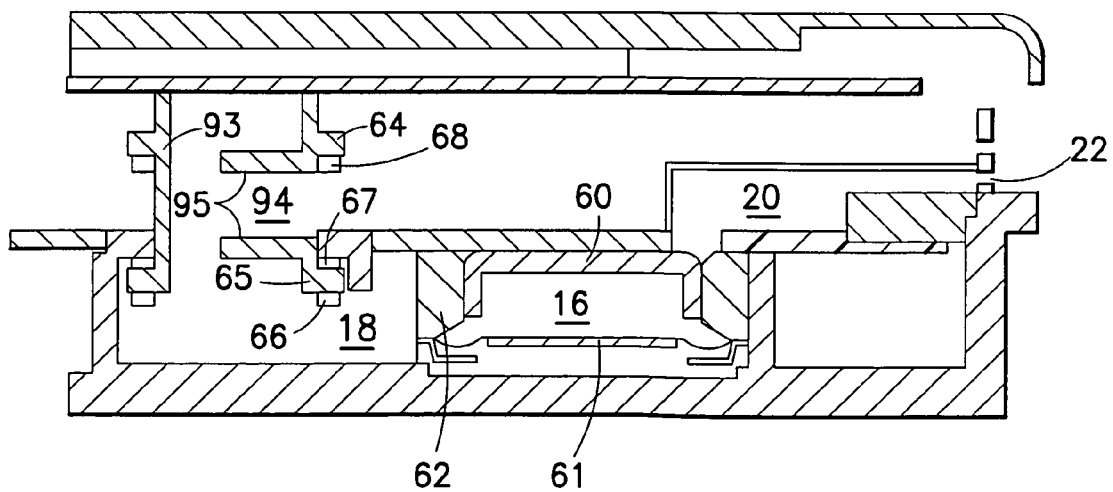

FIGS. 7A and 7B, collectively referred to as FIG. 7, are cross-sections through a sixth embodiment of apparatus according to the invention in closed and open positions respectively. Reference numerals are retained from previous Figures for like elements. In FIG. 7A, the mobile telephone in a closed position, and in FIG. 7B the mobile phone 10 is in an open position. In FIG. 7, the rear cavity 18 is formed beneath a PWB 40 within a second body part 14 and by a part of the housing forming the second body part 14.

The transducer 16 is shown to comprise a magnet 60, a diaphragm 61 and a frame 62. The magnet 60 together with a coil (not shown) causes the diaphragm to reciprocate in a vertical direction in the Figure upon application of an electrical signal.

A vented tube 93 is arranged vertically. The vented tube 93 is fixed at its uppermost end to the first body part 12 in a sealed manner. The vented tube 93 is open at its lowermost end. The vented tube includes an aperture 94 in its side wall. The aperture 94 is bordered by a horizontal tube 95. The horizontal tube 95 extends slightly more than half way into the vented tube 93. The horizontal tube 95 meets and is attached to the side wall of the vented tube 93 at the edges of the aperture 94. The aperture 94 and the horizontal tube 95 allow air to pass between the interior volume of the tube and the exterior of the tube, and it is for this reason that the tube 93 can be termed a vented tube.

The vented tube 93 extends through a circular aperture in the second body part 14 such that the lowermost end is located within the rear cavity 18. A first flange 64 extends around the outside circumference of the vented tube 93 at a position approximately three quarters of the way along the tube, nearest the uppermost end of the vented tube 93 and above the uppermost limit of the aperture 94 and the horizontal tube 95. A second flange 65 extends around the outside circumference of the vented tube 93 at the lowermost end of the vented tube 93.

Gaskets provide some sealing of the rear cavity 18 when in the open and closed positions. In particular, a first gasket 66 is located on a lower surface of the second flange 65. Also, a second gasket 67 is provided on an upper surface of the second flange 65. Lastly, a third gasket 68 is provided on a lower surface of the first flange 64. The gaskets 66-68 are generally annular in shape. Uppermost and lowermost surfaces of the gaskets 66-68 are generally planar. This allows the gaskets 66-68 to form good seals with horizontal planar surfaces into which they are brought in contact.

In the closed position, shown in FIG. 7A, the first gasket 66 seals the bottom of the vented tube 93 from the rear cavity 18 by contacting the floor of the cavity 18. However, in this position the aperture 94 is wholly within the second body part 14. As such, in the closed position, air is able to move between the rear cavity 18 and the interior of the vented tube 93 by way of the aperture 94 and the horizontal tube 95. In the closed position, the third gasket 68 contacts the uppermost surface of the second body part 14. This provides a seal to prevent the movement of air between the rear cavity 18 and the environment external to the mobile phone 10. As such, in the closed position, the rear cavity 18 is sealed from the external environment and has a volume that comprises the internal volume of the vented tube 93 in addition to the part of the second body part that defines the rear cavity 18 external to the tube 93.

In the open position, shown in FIG. 7B, the second gasket 67 contacts the downwardly facing surface of the second body part 14 that is opposite to the surface of the body part 14 that was contacted by the third gasket 68 when in the closed position. This provides a seal to prevent the movement of air directly between the part of the rear cavity 18 that is wholly within the second body part 14 and the environment external to the mobile phone 10. In the open position, the lower end of the vented tube 93 is separated from the floor of the second body part 14, and air is able to move into the interior volume of the vented tube 93 through its lower end. Also, the aperture 94 is wholly or largely without the second body part 14, and with the horizontal tube allows air to pass from the volume internal to the vented tube 93 to the region between the first and second body parts 12, 14, this region not being sealed within the mobile phone 10. As such, the rear cavity 18 is vented to atmosphere when the mobile phone 10 is in the open position. Put another way, a bass reflex port is provided by the vented tube 93 when the mobile phone 10 is in the open position.

The presence of the bass reflex port improves the bass response of the arrangement when the mobile phone 10 is in the open position.

Although the vented tube 93 is described as being circular in cross-section, it will be appreciated that it may take any suitable form. The same applies to the horizontal tube 95.

In other embodiments (not shown in the Figures), a third cavity may be provided. This will now be described with reference to FIG. 7, although these embodiments are not shown in that Figure.

The third cavity may be formed between the first and second body parts 12, 14, or it may be defined by one of those body parts. Instead of the opening 22 extending from the front cavity to atmosphere, a channel extends from the front cavity 20 into the third cavity. The front cavity 20 is coupled to the third cavity by the channel whether the mobile phone 10 is on the open position or the closed position. The channel constitutes a tuned leak. The tuned leak can be relatively small. The tuned leak forms a resonance with the front cavity 20. The response of the front cavity 20 is radiated into the third cavity.

The opening 22 is formed by a channel connecting the third cavity to the atmosphere external to the mobile phone 10.

The bass reflex port 94 extends into the third cavity. As such, the rear cavity 18 is coupled to the third cavity when the mobile phone 10 is in the open position, and is not so coupled when the mobile phone 10 is in the closed position. The third cavity forms a mixing chamber.

These embodiments may involve relatively complex sealing arrangements, but can provide good performance.

In other embodiments (not shown in the Figures) a mobile phone 10 is provided with features that result in an opening 22 in the open position that is shorter than the opening when in the closed position and in which the rear cavity volume is greater in the open position than it is in the closed position. For instance, these embodiments may incorporate the opening length adjusting features of FIG. 6 and the rear cavity increasing features of FIG. 3 or FIG. 4. These embodiments provide a higher highest resonant frequency and a lower lowest resonant frequency. As such, the bandwidth of these arrangements can be considerably higher than that provided by a corresponding arrangement with only one of the bandwidth increasing arrangements.

In other embodiments (not shown in the Figures) a mobile phone 10 is provided with features that result in an opening 22 in the open position that has a greater area than the opening when in the closed position and in which the rear cavity volume is greater in the open position than it is in the closed position. For instance, these embodiments may incorporate the opening area adjusting features of FIG. 2 or 5 and the rear cavity increasing features of FIG. 3 or FIG. 4. These embodiments provide a higher highest resonant frequency and with a lower lowest resonant frequency. As such, the bandwidth of these arrangements can be considerably higher than that provided by a corresponding arrangement with only one of the bandwidth increasing arrangements.

In other embodiments (not shown in the Figures) a mobile phone 10 is provided with features that result in an opening 22 in the open position that has a greater area than the opening when in the closed position and in which the rear cavity volume is provided with a bass reflex port in the open position and not in the closed position. For instance, these embodiments may incorporate the opening area adjusting features of FIG. 2 or 5 and the bass reflex port features of FIG. 7. These embodiments provide a higher highest resonant frequency, greater bandwidth and greater bass response in the open position.

In other embodiments (not shown in the Figures) a mobile phone 10 is provided with features that result in an opening 22 in the open position that is shorter than the opening when in the closed position and in which the rear cavity volume is provided with a bass reflex port in the open position and not in the closed position. For instance, these embodiments may incorporate the opening length adjusting features of FIG. 6 and the bass reflex port features of FIG. 7. These embodiments provide a higher highest resonant frequency, greater bandwidth and greater bass response in the open position In the above embodiments, the transducer 16 provides a handsfree speaker function. In these embodiments, an earpiece speaker may additionally be provided.

Figure 8:
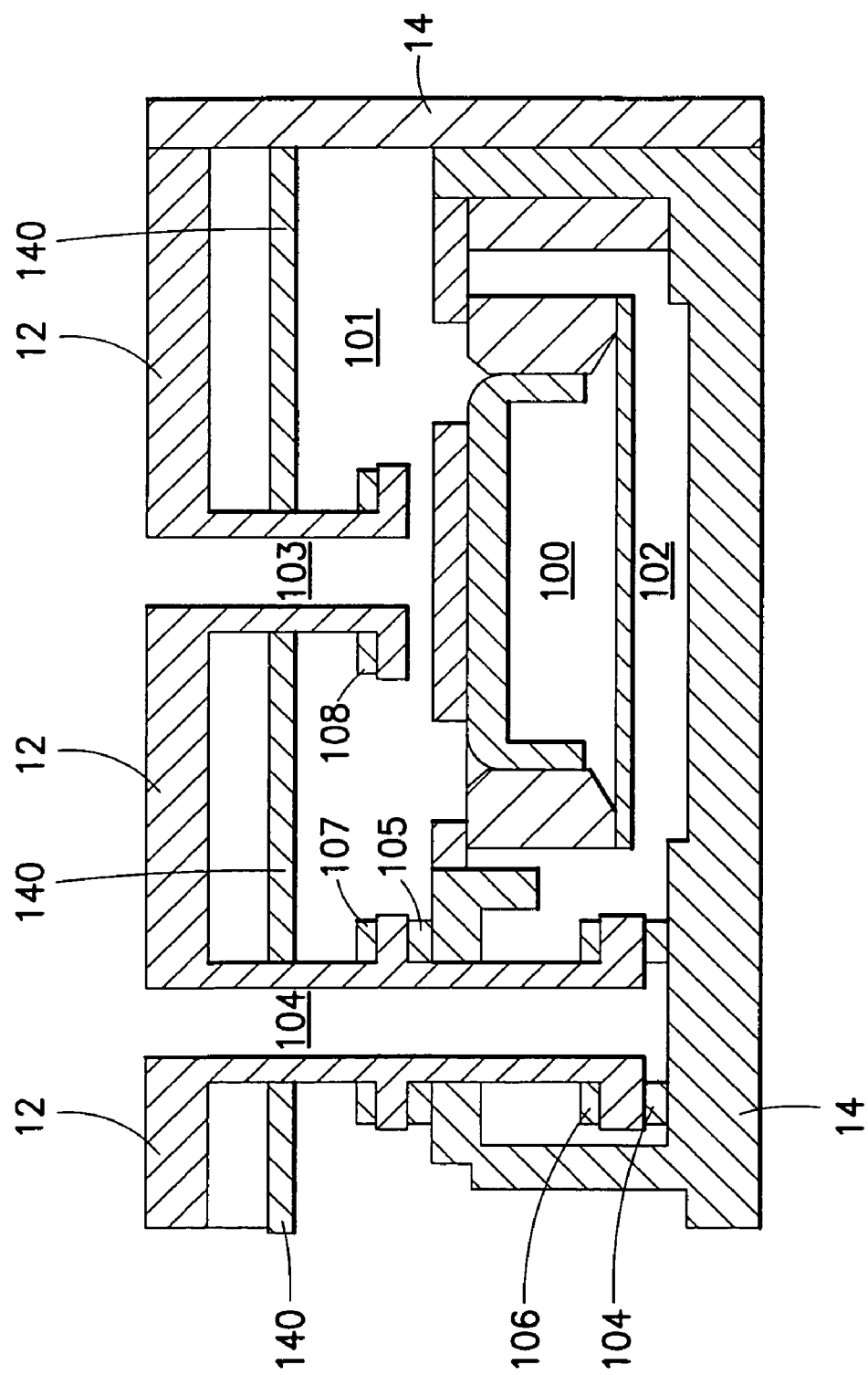
FIG. 8 is a cross-section through a seventh embodiment of apparatus according to the invention in a closed position.

In other embodiments the principles used in the above discussed embodiments are applied to earpiece speaker arrangements. One such example will now be described with reference to FIG. 8. FIG. 8 is a cross-section through a seventh embodiment of apparatus according to the invention in a closed position.

In FIG. 8, an earpiece transducer 100 is provided in a second body part 14, which is moveable in a vertical direction with respect to a first body part 12. A housing part 140 provides an uppermost part of the second body part 14.

The earpiece transducer 100 is coupled to a front cavity 101 at its upper side and a rear cavity 102 at its lower side. The front cavity 101 is coupled to atmosphere at an upper surface of the mobile phone 10 by a outlet tube 103. The outlet tube 103 is open at both ends. This allows a user to hear sounds generated by the transducer 100 by placing the upper end of the outlet tube 103 near their ear.

A bass reflex tube extends from the 104 at an upper surface of the mobile phone 10 into the rear cavity 102, to provide a switchable bass reflex port.

FIG. 8 illustrates the mobile phone 10 in a closed position. In this position, the front cavity 102 is open to the outlet tube 103. However, a gasket 104 seals the lowermost end of the bass reflex port 104 to the floor of the rear cavity 102. A second gasket 105 seals around the bass reflex port 104 at a position near the ceiling of the rear cavity 102. As such, in the closed position air cannot move between the rear cavity 102 and the interior of the bass reflex port 104. In the closed position, therefore, the bass reflex port is inactive.

In an open position (not shown), the bass reflex port 104, the outlet tube 103 and the first body part 102 are moved upwards by a distance of a few mm. In the open position, a third gasket 106 provides a seal between the bass reflex port 104 and the ceiling of the rear cavity 102. A fourth gasket 107 provides a seal between the bass reflex port and the housing part 140. Also a fifth gasket 18 provides a seal between the outlet tube 103 and the ceiling of the front cavity 101. In the open position, air is free to move from the rear cavity 102 into the bass reflex port 104, and thus the bass reflex port is active. The volume of the front cavity is substantially unchanged.

In the open position, the FIG. 8 arrangement has improved low frequency response because of the activation of the bass reflex port 104. This can provide increased loudness, which may be particularly useful where the user is located in a environment with loud background noise. The placement of the opening of the bass reflex port 104 near the opening of the sound outlet 103 allows both to be placed near to a user's ear simultaneously.

The bass reflex port 104 and the sound outlet 103 may be cylindrical, or they may be any other suitable shape.

The rear cavity 102 may be sealed. Alternatively there may be a controlled leak to atmosphere.

The first body part 12 may be a bezel, for instance forming part of an A cover of the mobile phone 10. The bezel 12 may hide the sound outlet constituted by the exterior end of the tube 103 from the user.

In other embodiments (not shown in the Figures) a mobile phone 10 is provided with an earpiece speaker 100 and with features that result in an opening 22 in the open position that has a greater area than the opening when in the closed position. The skilled person will be able to conceive numerous implementations of these embodiments, so detailed descriptions are omitted here for conciseness. These embodiments can provide a higher highest resonant frequency and thus greater bandwidth in the open position. Some of these embodiments utilise bass reflex port activation features, such as those shown in FIG. 8, and others do not.

In other embodiments (not shown in the Figures) a mobile phone 10 is provided with an earpiece speaker 100 and with features that result in an opening 22 in the open position that has a shorter length than the opening when in the closed position. The skilled person will be able to conceive numerous implementations of these embodiments, so detailed descriptions are omitted here for conciseness. These embodiments can provide a higher highest resonant frequency and thus greater bandwidth in the open position. Some of these embodiments utilise bass reflex port activation features, such as those shown in FIG. 8, and others do not.

In other embodiments (not shown in the Figures) a mobile phone 10 is provided with an earpiece speaker 100 and with features that result in the front cavity volume being less in the open position than it is in the closed position. The skilled person will be able to conceive numerous implementations of these embodiments, so detailed descriptions are omitted here for conciseness. These embodiments can provide a higher highest resonant frequency and thus greater bandwidth in the open position. Some of these embodiments utilise bass reflex port activation features, such as those shown in FIG. 8, and others do not.

In all of the embodiments, the mobile phone 10 may be provided with a processor 32 and a memory. A computer program may be stored in the memory and be executed by the processor 32. The processor 32 may comprise multiple microprocessors or processing cores, or may comprise a single processor.

In the embodiments the computer program includes instructions that cause the processor to prevent the transducer 16 being provided with signals when the mobile phone 10 is between the open and closed positions. This may happen in any suitable way, for instance by disabling a digital signal processing component or system or by controlling a switch component or system in the electrical circuit prior to the transducer 16. This may help to prevent damage to the transducer 16, which might otherwise result from changes in air pressure as the physical configuration changes.

In embodiments incorporating both an earpiece and a handsfree speaker, both may be controlled to operate simultaneously when the mobile phone is in the open position. In this way the frequency responses of the two speakers can be combined to produce a wider response than would be available if only one speaker were used.

In the embodiments it is described how frequency response is varied by the mechanical arrangement of the apparatus as the apparatus moves between open and closed positions. It will be appreciated that frequency response may in each case be adjusted by the DSP 30. However, the amount of processing that is used may be less using the above embodiments than in the corresponding prior art arrangement. The DSP 30 may operate differently in the open and closed positions. In this way, the different frequency response of the mechanical arrangement in the open and closed positions can be compensated for, with the DSP 30 supplementing the mechanical frequency response to provide the desired frequency response.

Although in the above adjustment of at least one of the dimensions of the front cavity 20, the dimensions of the opening 22, the dimensions of the rear cavity 18 and control of the bass reflex port activation is effected by moving the first and second body parts in a direction perpendicular to a longitudinal axis of the mobile telephone 10, variations will be apparent to the skilled person. For instance, the first and second body parts 12, 14 may be slideable in relation to one another. Sliding may occur in a longitudinal directions, as in a conventional slide phone arrangement, or in a transverse direction, as is often found with slide-out QWERTY keypads, for instance. Alternatively, the movement may be a rotational movement, for instance as in a flip type phone or a Nokia Communicator™, or in a swivel type, such as is found in Nokia's 7370 model.

Although air is described as being the fluid present within the arrangements of the embodiments it will be appreciated that other fluids may be used instead.

Although the above described embodiments relate to hand-held communication devices, in the form of mobile phones 10, the invention is applicable also to devices such as media players and the like that may not necessarily have wireless communication capability.

What is claimed is:

1. Apparatus comprising:
a housing, the housing comprising a first body part and a second body part, the first body part being moveable relative to the second body part, wherein the housing has a first configuration when the first body part is in a first position relative to the second body part and a second configuration when the first body part is in a second position relative to the second body part; and
a speaker arrangement, wherein the speaker arrangement comprises:
a transducer,
a front cavity coupled to a first side of the transducer, and an opening, the opening connecting the front cavity to an exterior of the housing, and
a rear cavity coupled to a second side of the transducer, the second side of the transducer being on an opposite side of the transducer to the first side of the transducer, wherein the speaker arrangement has a first physical arrangement when the housing is in the first configuration and a second physical arrangement when the housing is in the second configuration, the first physical arrangement being different to the second physical arrangement, wherein the apparatus is configured such that at least one of an area and a length of the opening is greater when the housing is in the first configuration than when the housing is in the second configuration.

2. Apparatus as claimed in claim 1, wherein the opening comprises plural channels, and wherein the apparatus is configured such that at least one of the plural channels are blocked when the housing is in the second configuration and such that the at least one of the plural channels are not blocked when the apparatus is in the first configuration.

3. Apparatus as claimed in claim 1, wherein the opening comprises plural channels formed in the second body part, and a blocking component attached with the first body part, wherein the apparatus is configured such that at least one of the plural channels are blocked by the blocking component when the housing is in the second configuration and such that the at least one of the plural channels are not blocked by the blocking component when the apparatus is in the first configuration.

4. Apparatus as claimed in claim 1, wherein the opening comprises an aperture in a first component when the apparatus is in the second configuration and wherein the opening comprises the aperture in the first component and a second aperture in a second component when the apparatus is in the first configuration, the first and second apertures being aligned when the apparatus is in the first configuration, and the first and second apertures not being aligned when the apparatus is in the second configuration.

5. Apparatus as claimed in claim 4, wherein the first component is attached to or is integral with the second body part and wherein the second component is attached to or is integral with the first body part.

6. Apparatus as claimed in claim 1, wherein the apparatus is a hand-portable communications device.

7. Apparatus as claimed in claim 6, wherein the transducer is an integrated handsfree transducer, and wherein the opening is located at a side part of the hand-portable communications device.

8. Apparatus as claimed in claim 6, wherein the transducer is an earpiece transducer and wherein the opening is located on a main face of the hand-portable communications device.

9. Apparatus as claimed in claim 1, wherein the rear cavity is sealed when the apparatus is in the second configuration.

10. Apparatus as claimed in claim 1, wherein the opening connects the front cavity to the exterior of the housing directly.

11. Apparatus as claimed in claim 1, wherein the front cavity is coupled to a third cavity, and wherein the opening couples the third cavity to the exterior of the housing.

12. Apparatus as claimed in claim 1, wherein the area of the opening when the housing is in the second configuration is non-zero and wherein the length of the opening when the housing is in the second configuration is non-zero.

13. Apparatus comprising:
a housing, the housing comprising a first body part and a second body part, the first body part being moveable relative to the second body part wherein the housing has a first configuration when the first body part is in a first position relative to the second body part and a second configuration when the first body part is in a second position relative to the second body part; and
a speaker arrangement, wherein the speaker arrangement comprises:
a transducer,
a front cavity coupled to a first side of the transducer, and
an opening, the opening connecting the front cavity to an exterior of the housing, and
a rear cavity coupled to a second side of the transducer, the second side of the transducer being on an opposite side of the transducer to the first side of the transducer, wherein the speaker arrangement has a first physical arrangement when the housing is in the first configuration and a second physical arrangement when the housing is in the second configuration, the first physical arrangement being different to the second physical arrangement, wherein the apparatus is configured such that an internal volume of the rear cavity when the housing is in the first configuration is greater than the internal volume of the rear cavity when the housing is in the second configuration.

14. Apparatus as claimed in claim 13, wherein the apparatus comprises a hollow component having one end attached to the first body part, the first end being sealed, and having a second end extending into a part of the rear cavity that is defined in the second body part, wherein the hollow component moves with the first body part relative to the second body part such that the internal volume of the rear cavity when the housing is in the first configuration is greater than the internal volume of the rear cavity when the housing is in the second configuration.

15. Apparatus as claimed in claim 14, wherein the apparatus is configured such that the second end of the hollow component is closed when the housing is in the second configuration.

16. Apparatus as claimed in claim 14, wherein the apparatus is configured such that the second end of the hollow component is located against a surface of the second body part that defines the rear cavity when the housing is in the second configuration.

17. Apparatus comprising:
a housing, the housing comprising a first body part and a second body part, the first body part being moveable relative to the second body part, wherein the housing has a first configuration when the first body part is in a first position relative to the second body part and a second configuration when the first body part is in a second position relative to the second body part; and
a speaker arrangement, wherein the speaker arrangement comprises:
a transducer,
a front cavity coupled to a first side of the transducer, and
an opening, the opening connecting the front cavity to an exterior of the housing, and
a rear cavity coupled to a second side of the transducer, the second side of the transducer being on an opposite side of the transducer to the first side of the transducer, wherein the speaker arrangement has a first physical arrangement when the housing is in the first configuration and a second physical arrangement when the housing is in the second configuration, the first physical arrangement being different to the second physical arrangement, wherein the speaker arrangement comprises a bass reflex port and wherein the apparatus is configured such that the bass reflex port is closed when the housing is in the second configuration and the bass reflex port is open when the housing is in the first configuration.

18. Apparatus as claimed in claim 17, wherein the apparatus comprises a hollow component having a first end attached to the first body part, the first end being sealed, and having a second end extending into a part of the rear cavity that is defined in the second body part, wherein the apparatus is configured such that the second end of the hollow component is closed when the housing is in the second configuration, wherein the hollow component includes the bass reflex port as providing a channel between the interior of the hollow component and the exterior of the housing, and wherein the hollow component and the bass reflex port move with the first body part relative to the second body part such as to form a channel between the rear cavity and the exterior of the housing when the housing is in the first configuration.

* * * * *